(12) United States Patent
Takahashi et al.

(10) Patent No.: US 10,052,574 B2
(45) Date of Patent: Aug. 21, 2018

(54) FILTRATION DEVICE AND FILTER ELEMENT

(71) Applicants: FUJI FILTER MANUFACTURING CO., LTD., Tokyo (JP); JFE Engineering Corporation, Tokyo (JP)

(72) Inventors: Yuichi Takahashi, Utsunomiya (JP); Masanori Nagafuji, Tokyo (JP); Yusuke Shimono, Tokyo (JP)

(73) Assignees: FUJI FILTER MANUFACTURING CO., LTD., Tokyo (JP); JFE ENGINEERING CORPORATION, Tokyo (JP)

( * ) Notice: Subject to any disclaimer, the term of this patent is extended or adjusted under 35 U.S.C. 154(b) by 203 days.

(21) Appl. No.: 15/028,413

(22) PCT Filed: Mar. 25, 2015

(86) PCT No.: PCT/JP2015/059170
§ 371 (c)(1),
(2) Date: Apr. 8, 2016

(87) PCT Pub. No.: WO2016/002275
PCT Pub. Date: Jan. 7, 2016

(65) Prior Publication Data
US 2016/0228801 A1    Aug. 11, 2016

(30) Foreign Application Priority Data

Jun. 30, 2014  (JP) .................................. 2014-134510

(51) Int. Cl.
*B01D 29/68*  (2006.01)
*B01D 29/52*  (2006.01)
(Continued)

(52) U.S. Cl.
CPC ............. *B01D 29/68* (2013.01); *B01D 29/15* (2013.01); *B01D 29/52* (2013.01);
(Continued)

(58) Field of Classification Search
None
See application file for complete search history.

(56) References Cited

U.S. PATENT DOCUMENTS 2,858,894 A   11/1958  Akeyson
3,380,591 A    4/1968  Muller et al.
(Continued)

FOREIGN PATENT DOCUMENTS

JP    32-068380    3/1990
JP     3-038119    4/1991
(Continued)

OTHER PUBLICATIONS

Japanese Office Action from Japanese Patent Application No. 2014-134510, dated Jul. 11, 2017.
(Continued)

*Primary Examiner* — Chester T Barry
(74) *Attorney, Agent, or Firm* — McDermott, Will & Emery LLP

(57) ABSTRACT

A filtration device including: a casing; a first partition wall which partitions the inside of the casing into a first raw fluid chamber and a filtered-fluid chamber; cylindrical filter elements provided inside the filtered-fluid chamber and of which the inside communicates with the first raw fluid chamber to let fluid pass through from inside toward outside to filter the fluid; a second partition wall provided on the other end of the filter elements to form a second raw fluid chamber; a wash pipe connected to an end of the filter element to let fluid flow from the raw fluid chamber in the axial direction to wash the filter elements; and a wash fluid drain pipe which discharges trapped substances, wherein the other end of the filter element connected to the wash pipe is always open to the raw fluid chamber.

7 Claims, 14 Drawing Sheets

(51) Int. Cl.
*B01D 29/15* (2006.01)
*B01D 29/64* (2006.01)
*B01D 29/66* (2006.01)

(52) U.S. Cl.
CPC ....... *B01D 29/6484* (2013.01); *B01D 29/668* (2013.01); *B01D 2201/0453* (2013.01)

(56) References Cited

U.S. PATENT DOCUMENTS

| | | |
|---|---|---|
| 2002/0092805 A1 | 7/2002 | Koivula |
| 2012/0125834 A1 | 5/2012 | Gessner et al. |
| 2014/0183110 A1 | 7/2014 | Schlichter et al. |

FOREIGN PATENT DOCUMENTS

| | | |
|---|---|---|
| JP | 5-212216 | 8/1993 |
| JP | H 07-194907 A | 8/1995 |
| JP | 2003-509200 A | 3/2003 |
| JP | 2013-013839 A | 1/2013 |
| JP | 2014-004571 A | 1/2014 |
| JP | 2014-034029 A | 2/2014 |
| WO | 2007/062763 A1 | 6/2007 |
| WO | 2013/029761 A1 | 3/2013 |

OTHER PUBLICATIONS

International Preliminary Report on Patentability dated Jan. 12, 2017, which issued in International Application No. PCT/JP2015/059170.
Japanese Office Action from Japanese Patent Application No. 2014-134510, dated Apr. 11, 2017.

FILTRATION DEVICE AND FILTER ELEMENT

TECHNICAL FIELD

The present invention relates to a filtration device which filters fluid, specifically to a filtration device and a filter element, where the filtration device is capable of filtering fluid by letting the fluid pass through a cylindrical filter element from the inside to the outside thereof, and removing, by an axial direction flow inside the filter element, trapped substances trapped inside the filter element by filtration.

BACKGROUND ART

Conventionally, in the filtration of water such as seawater, lake water, river water, water in a water supply, and water in a sewerage system, the filtration of liquid for general industrial use such as cooling water for various devices or process liquid, and the filtration of gas and the like of various raw materials for use in a chemical plant or the like, various filtration devices have been used for the purpose of trapping and removing fine particles, dust, and the like contained therein.

When a filtration device as mentioned above is operated for filtration for a long period, solid matter, gel dust, and the like are trapped and accumulated in the filter element, so that resistance for the fluid to pass through a filter medium increases, and this makes it difficult to filter target fluid in the end. In order to cope with this problem, for example, a process called "backwashing" is carried out periodically, in which fluid is made to pass through the filter element in a direction opposite to the flow direction for filtration, to remove trapped substances adhering to the filter element in order to restore filtration performance of the filter element. This method called "backwashing" is an excellent method capable of reducing filter-passing resistance to approximate the initial passing resistance easily without demounting the filter. In particular, in the case of a filtration device provided with a dedicated backwashing channel (a backwash pipe and a backwash fluid drain pipe), it is advantageous in that backwashing can be carried out without interrupting the filtration.

As such a filtration device capable of carrying out "backwashing," there is a filtering apparatus including: an inlet for fluid to be filtered; an outlet for filtered fluid; a number of parallel filter elements, each of which is open at both ends and into which the fluid to be filtered is sent so that infiltration toward the outside of the element through the element will occur; and at least one washing mechanism connected alternately to different ends of each filter element among both ends of the filter element, wherein the washing mechanism forms a discharge channel for backwash of the elements generated by the pressure of a filtered flow, and each of the filter elements is divided into two parts between the ends so that the washing mechanism connected to each end of the element will cause backflushing only to a certain part of the length of the element at a time (for example, see Patent Document 1).

Further, there is a similar filtration device including: an inlet for fluid to be filtered; an outlet for filtered fluid; a number of parallel filter elements, each of which is open at both ends; and a washing mechanism connected alternately to different ends of each element among both ends of the filter elements, wherein the washing mechanism forms a discharge channel for backwash of the elements generated by the pressure of a filtered fluid (for example, see Patent Document 2).

REFERENCE DOCUMENT LIST

Patent Documents

JP 2003-509200 A
Patent Document 2: WO 2007/062763 A1

SUMMARY OF THE INVENTION

Problems to be Solved by the Invention

However, in the filtration devices using conventional backwashing, there is a first problem that washing is effective only in a part of each filter element near the end connected to a backflush discharge channel during backwashing. That is, in the filter element extending in the longitudinal direction, the quantity of fluid passing through the filter element from the outside to the inside is high in a part near the end connected to the discharge channel and the effect of backwashing is high in such a part, but the quantity of the passing fluid decreases as the position leaves from the end and the effect of backwash thereby decreases. In the devices of Patent Documents 1 and 2, trapped substances are washed out not only by a flow in a direction opposite to the filtering direction, but also by an axial direction flow of the filter element caused by suction into the discharge channel during backwashing. However, since the other end of the filter element is closed during backwashing or a partition or narrowed portion is provided in the central part of the element, the axial direction flow becomes weak as the position leaves from the end connected to a backwash arm, resulting in a reduction in the backwashing effect.

There is also a second problem that foreign substances adhere to the outside of the filter element due to backwashing. That is, it is common practice in this type of filter to carry out backwashing using a filtered fluid, but this filtered fluid contains foreign substances that have passed through the mesh of the filter. A typical example is long and thin particles. There may be a case in which such particles pass through the mesh of the filter during filtration but are trapped in the same mesh of the filter during backwashing. The foreign substances trapped during backwashing may be removed from the filter during filtration in some cases, but it is generally difficult to remove the trapped substances because the flow rate passing through the filter during filtration is low as compared with that during backwashing. As a result, there is a problem that the filtration performance is degraded by the foreign substances adhering to the outside of the filter element.

Further, there is a third problem in that the filter element is likely to be crushed from the outside to the inside due to a difference in pressure applied between the inside and the outside during backwashing. Therefore, the filter element undergoing backwashing needs to bear not only the inside and outside pressure difference during filtration, but also the outside and inside pressure difference during backwashing. In the case of a filter medium using wedge wires or notch wires or a filter medium made of a wire mesh, a perforated plate, or the like, in order to make the filtration accuracy finer and to make the permeation resistance lower, the filter medium needs to be thinner and hence the strength becomes low. When the filtration direction is from the inside to the outside of a cylindrical filter element like in the present invention, at a time of carrying out filtration, since a force acting on the filter medium is a tensile stress, there is no need for reinforcement, or even if there is any need, it will be sufficient to arrange a reinforcing wire mesh outside of the cylindrical filter medium. In contrast, at a time of carrying out backwashing, since a compressive stress is added from the outside, the above-mentioned filter medium having low in strength may be crushed. As a measure therefor, since arrangement of a reinforcing wire mesh inside of the filter medium makes it difficult to wash the filter medium, it is necessary to arrange the reinforcing wire mesh outside of the filter medium and join them by diffusion bonding (sintering), welding, brazing, adhesive bonding, or the like.

Therefore, to cope with the above problems, the problems to be solved by the invention is to provide a filtration device and a filter element, capable of letting fluid pass through a cylindrical filter element from the inside to the outside to filter the fluid, and capable of removing trapped substances trapped inside the filter element due to filtration by an axial direction flow inside the filter element to thereby solve the above-mentioned backwashing problems.

Means for Solving the Problems

In order to attain the object, a filtration device according to the present invention includes: a casing having a fluid inlet into which fluid flows from outside and a fluid outlet from which fluid filtered inside thereof flows to the outside; a first partition wall which partitions the inside of the casing into a first raw fluid chamber communicating with the fluid inlet for storing fluid before being filtered, and a filtered-fluid chamber communicating with the fluid outlet for storing filtered fluid; a cylindrical filter element provided inside the filtered-fluid chamber in such a manner that one end thereof is fitted and held in a through hole formed in the first partition wall, and inside thereof communicates with the first raw fluid chamber to let fluid pass through from the inside to the outside so as to filter the fluid; a second partition wall provided on the other end side of the filter element in parallel with the first partition wall, which fits and holds the other end of the filter element in a through hole to form a second raw fluid chamber communicating with the first raw fluid chamber, and partitions the inside of the casing into the filtered-fluid chamber and a second raw fluid chamber; a wash pipe connected to at least one end side of the filter element to cause fluid to flow in an axial direction of the filter element from the first or second raw fluid chamber via the other end of the filter element to wash the filter element; and a wash fluid drain pipe connected to a discharge side of the wash pipe to discharge, to the outside of the casing, trapped substances removed by washing the filter element, wherein the other end of the filter element connected to the wash pipe is always open to the first or second raw fluid chamber.

A filter element according to the present invention is a filter element having a cylindrical filter medium open at both ends, wherein openings of the mesh of the filter medium, which lets fluid pass through to filter the fluid, are openings elongated parallel with the axis of the filter medium.

Further, another filter element according to the present invention is a filter element having a cylindrical filter medium open at both ends, wherein a mesh pitch of the filter medium in an axial direction of the filter medium, which lets fluid pass through to filter the fluid, is larger than a mesh pitch of the filter medium in a circumferential direction of the filter medium.

EFFECTS OF THE INVENTION

According to the filtration device of the present invention, since there is provided the wash pipe connected to either one of the ends of the filter element to cause fluid to flow in the axial direction of the filter element from the second or first raw fluid chamber via the other end of the filter element, and the other end of the filter element connected to the wash pipe is always open to the first or second raw fluid chamber, a high-speed axial direction flow passing through the inside of the filter element and flowing into the wash pipe from the raw fluid chamber during washing can be generated to wash the filter by the axial direction flow. In addition, since pressure inside the filter element open to the raw fluid chamber is close to pressure in the raw fluid chamber, an outside to inside pressure difference from the filtered-fluid chamber outside of the filter element toward the inside of the filter element becomes a small or negative value. Therefore, since the inside of the filter element can be washed with the small or negative value of "backwashing" pressure during washing, the problems of washing unevenness of the filter element due to backwashing, adhesion to the outside of the filter element, the strength of the filter element, and the like can be solved.

According to the filter element of the present invention, since mesh-openings of the filter medium, which lets fluid pass through to filter the fluid, are set as openings elongated parallel with the axis of the filter medium (the axis of filter element), even particles and fibrous foreign substances stuck in the filter medium are easily removed by the axial direction flow of the filtration device during washing, and this can enhance the washing effect of the filtration device.

Further, in another filter element according to the present invention, since the mesh pitch of the filter medium in the axial direction of the filter medium, which lets fluid pass through to filter the fluid, is set larger than the mesh pitch in the circumferential direction of the filter medium, even foreign substances stuck in the mesh of the filter medium are easily removed by the axial direction flow of the filtration device during washing, and this can enhance the washing effect of the filtration device.

BRIEF DESCRIPTION OF THE DRAWINGS

FIG. 2 is an enlarged view of the filter element of the filtration device of FIG. 1, in which

FIG. 3 is a conceptual diagram illustrating examples of the structure of the innermost layer of a filter medium in the filter element according to the present invention, in which

FIG. 4 is a conceptual diagram illustrating another example of the structure of the innermost layer of a filter medium in the filter element according to the present invention, in which

MODES FOR CARRYING OUT THE INVENTION

Embodiments of the present invention will be described below with reference to the accompanying drawings.
[First Embodiment]
This embodiment is an embodiment for carrying out filter washing by an axial direction flow alone.

Figure 1:
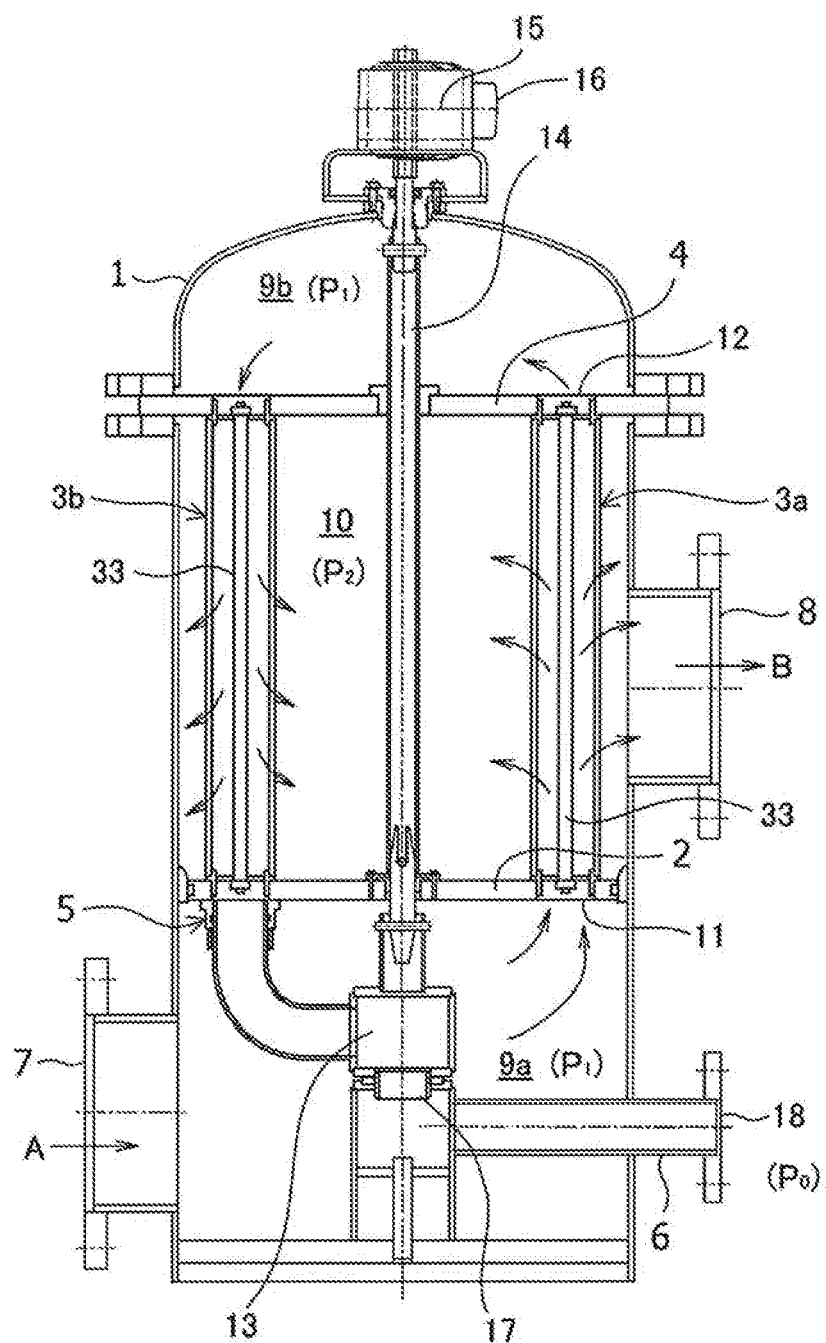
FIG. 1 is a schematic sectional view illustrating a state of a first embodiment of the filtration device according to the present invention during filtration.

FIG. 1 is a schematic sectional view illustrating a state of the first embodiment of a filtration device according to the present invention during filtration. This filtration device is to filter vessel's ballast water, and is configured to include a casing 1, a first partition wall 2, filter elements 3, a second partition wall 4, a wash pipe 5, and a wash fluid drain pipe 6.

The casing 1 serves as an outer shell of the filtration device, and is formed into a tubular shape (for example, a cylindrical shape) having an upper lid and a closed bottom, a rectangular parallelepiped shape, or the like, which has a fluid inlet 7, for example, in a lower end portion of the side wall to allow fluid to enter from the outside, and a fluid outlet 8 in an upper portion of the side wall to allow fluid filtered inside thereof to flow out to the outside. The material of the casing 1 is metal, synthetic resin, or the like, and the shape and size thereof can be determined appropriately according to the intended use of the filtration device, the kind and amount of liquid, gas, or the like to pass through, the installation location, and the like.

In a lower portion inside the casing 1, the first partition wall 2 is provided horizontally. This first partition wall 2 is a partition wall that partitions the inside of the casing into a first raw fluid chamber 9a communicating with the fluid inlet 7 for storing fluid before being filtered, and a filtered-fluid chamber 10 communicating with the fluid outlet 8 for storing the filtered fluid. In multiple portions of the first partition wall 2, through holes 11 are formed to fit and hold one end (lower end) of the filter element.

On the upper side of the first partition wall 2, the multiple filter elements 3 (two filter elements 3a, 3b are illustrated in FIG. 1) are provided inside the filtered-fluid chamber 10 in parallel in the vertical direction in such a manner that the lower end of each of the filter elements 3 is fitted and held in each of the through holes 11 and the inside thereof communicates with the first raw fluid chamber 9a. This filter element 3 lets target fluid pass through from the inside to the outside to trap and filter out solid matter, gel, dust, and the like contained in the fluid, and is washed out by letting the fluid flow inside the filter element in the axial direction. Each filter element 3 is formed into a tubular shape, for example, a cylindrical shape. For example, the filter elements 3 are arranged in concentric circular arrangement.

Figure 2A:
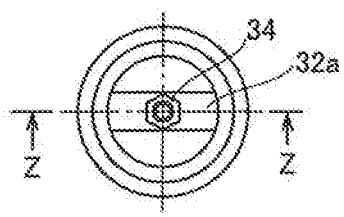
FIG. 2A is a plan view.
Figure 2B:
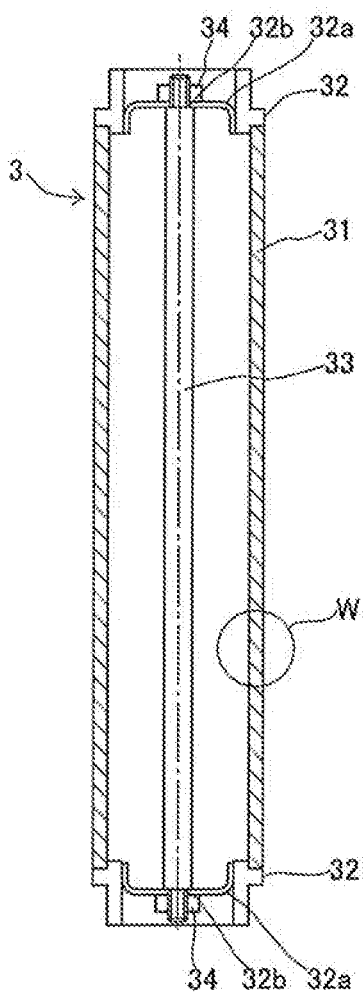
FIG. 2B is a Z-Z line sectional view of FIG. 2A.

As illustrated in FIGS. 2A and 2B, the structure of each filter element 3 is composed of a cylindrical filter medium 31 open at both ends, end members 32 having approximately annular shape fitted respective ends of the cylindrical filter medium 31 to reinforce the filter element 3, a center shaft rod 33 arranged on the center axis of the filter medium 31 having male-threaded end portions inserted into center holes 32b provided in bridge portions 32a of respective end members 32, and nuts 34 screwed onto the male threaded end portions of the center shaft rod 33 to fix the both-side end members 32 so as not to fall out of the filter medium 31.

The filter medium 31 forms a filter element main body, which may be any filter medium so long as it is formed into multiple laminated layers so that the innermost layer 31a will be the finest mesh. For example, it may be a filter medium made by sintering multiple laminated wire meshes to enhance shape retainability and forming them into a cylindrical shape and sintering the cylindrical one, a filter medium made up of cylindrical notch wires, a filter medium made up of wedge wires, or the like. In the case of the sintered one, the mesh sizes of the layers may be selected appropriately from mesh sizes of 10 to 200 μm for the innermost layer 31a and from mesh sizes of 200 to 5000 μm for the outer layers. In this case, since a reinforcing mesh 31b or a protective mesh 31b other than the innermost layer is related to the strength of the filter element, the number of layers, the mesh size, and the wire diameter are so selected that a required strength can be obtained. Further, as the way of weaving each mesh, plain weave, twilled weave, satin weave, dutch weave, twilled dutch weave, or the like can be applied. The structure may also be such that a wire mesh is provided as the innermost layer is and a cylindrical punching tube having numerous rectangular holes bored therein or a plurality of thin rods extending along the axial direction is arranged as a reinforcing member outside of the innermost layer, and they are sintered together.

The shape, size, and number of filter elements 3 may be determined appropriately according to the intended use of the filtration device, the filtration performance, the size of the casing 1, the kind of target fluid, and the like, and the filter element 3 may have a structure having no end members 32, no center shaft rod 33, and the like. However, in the present invention, since the axial direction flow inside each filter element 3 is used to wash the filter element 3, there is a need not to provide, inside the filter element 3, a partition or a narrowed portion that blocks the axial direction flow. In FIG. 2A, the width of the bridge portion 32a is also minimized to ensure a large opening area of the end members 32. This is because, when a partition or a narrowed portion is provided, not only is the axial direction flow blocked to reduce the washing effect, but also the partition or the narrowed portion causes pressure drop to reduce the fluid pressure on a side connected to the wash pipe 5 inside the filter element 3 to be much lower than the pressure (secondary pressure) of the filtered-fluid chamber 10, which increases the passage of fluid from the outside to the inside of the filter element to further decrease the axial direction flow, resulting in reduction of the washing effect especially on the other end side.

Returning to FIG. 1, the second partition wall 4 is provided on the other end (upper end) side of the filter element 3 in parallel with and horizontally to the first partition wall 2. This second partition wall 4 is a partition wall not only to fit and hold the upper ends of the filter elements 3 in the plurality of through holes 12 but also to isolate the upper end side of the filtered-fluid chamber 10 from the other part in order to form a second raw fluid chamber 9b.

This second raw fluid chamber 9b is formed between the upper end lid of the casing 1 and the second partition wall 4. The second raw fluid chamber 9b communicates with the first raw fluid chamber 9a and stores fluid before being filtered. In the embodiment, the communication with this first raw fluid chamber 9a is realized by using the inside of the cylindrical filter element 3 as a communication passage. However, there may be provided a separate communication passage such as a communication passage formed by a cylindrical wall in third and fourth embodiments to be described later. In particular, when resistance in the axial direction inside the filter element is relatively large, or when the number of filter elements 3 that are not connected to the wash pipe 5 is small, it is preferred to provide a separate communication passage.

The wash pipe 5 is arranged on the lower side of the first partition wall 2. In FIG. 1, the wash pipe 5 extends from its base end part 13 to the left in the radial direction, and is connected to a filter element 3 through a through hole 11 bored in the first partition wall 2. FIG. 1 illustrates a case in which the number of wash pipes 5 is one, but two or more wash pipes 5 may be so provided that the wash pipes 5 can be connected to two or more filter elements 3 at the same time.

The wash pipe 5 draws in fluid inside the filter element 3 to cause an axial direction flow from the second raw fluid chamber 9b connected to the other end of the filter element via the other end thereof toward an end at which the wash pipe is connected in order to remove trapped substances adhering to the inside. Note that so-called "backwashing" for letting fluid flow from the outside toward the inside of the filter element in a direction opposite to the direction during filtration is not necessarily carried out in the present invention.

The "drawing of fluid by the wash pipe" described here means that, since the pressure on the wash pipe side is lower than the pressure inside the filter element 3, a flow toward the wash pipe 5 is generated due to the pressure difference. In this specification, it is assumed below that the "suction of fluid by the wash pipe" means the "generation of a flow toward the wash pipe due to a pressure difference."

On the center axis of the base end part 13 of the wash pipe 5, a shaft 14 is mounted upward to project to the outside of the casing 1, and a gear box 15 is provided at the end of the shaft 14 so that the shaft is rotated by a motor 16. Thus, the shaft 14 is rotated by the motor 16, and the wash pipe 5 is rotated, for example, clockwise so that the wash pipe 5 will be connected sequentially to an opening at the lower end of each of the multiple filter elements 3 circumferentially arranged, for example.

As illustrated in FIG. 1, the wash fluid drain pipe 6 is connected to the discharge side of the wash pipe 5, i.e., to the base end part 13 of the wash pipe 5. This wash fluid drain pipe 6 is to discharge, to the outside of the casing 1, trapped substances removed during washing of the filter element 3, which is formed into a linear pipe extending in the radial direction of the casing 1. At the base end of the wash fluid drain pipe 6, a connecting port 17 is provided so as to open upward, and the base end part 13 of the wash pipe 5 is rotatably connected to this connecting port 17. Further, an outlet 18 at the distal end of the wash fluid drain pipe 6 projects to the outside of the casing 1.

The wash fluid drain pipe 6 is fixed to the casing 1, and at a connection of the connecting port 17 at the base end of the wash fluid drain pipe 6 with the base end part 13 of the wash pipe 5, a bearing mechanism such as a bearing is interposed for support, and a seal mechanism is provided to prevent discharged substances from mixing with unfiltered fluid. Thus, the wash pipe 5 is rotated by the motor 16 using the connecting port 17 as a rotation support part while keeping the seal of the connecting port 17 with the base end part 13 of the wash pipe 5.

To the discharge side of the outlet 18 of the wash fluid drain pipe 6, an on-off valve, not illustrated, is connected. This on-off valve opens or closes a wash fluid discharging system including the wash pipe 5 and the wash fluid drain pipe 6 so as to open the system during washing of the filtration device and close the system during filtration. The discharge side of this on-off valve is released to a side lower in pressure than the pressure of the fluid outlet 8, for example, to the atmospheric pressure.

In this case, during filtration, fluid passes through the filter element to filter the fluid due to a differential pressure between fluid pressure (primary pressure $P_1$) in the raw fluid chambers 9a, 9b and fluid pressure (secondary pressure $P_2$) in the filtered-fluid chamber 10. On the other hand, during washing of the filtration device, an axial direction flow inside a filter element connected to the wash pipe is caused and the filter element is washed due to a differential pressure ($P_1-P_0$) between pressure (primary pressure $P_1$) in the raw fluid chambers 9a, 9b and pressure ($P_0$) on the discharge side of the on-off valve. As the value of $P_1-P_0$ increases, not only does the rate of the axial direction flow increases, but also the probability of occurrence of a turbulent flow increases, resulting in an increased washing effect. Here, in the case of a filter for high flow rate filtration (e.g., a filter for ballast water), the filter is designed to have a small pressure loss in the transmission direction thereof, and the value of $P_1-P_2$ is set to about 0.05 MPa to 0.5 MPa.

Figure 5:
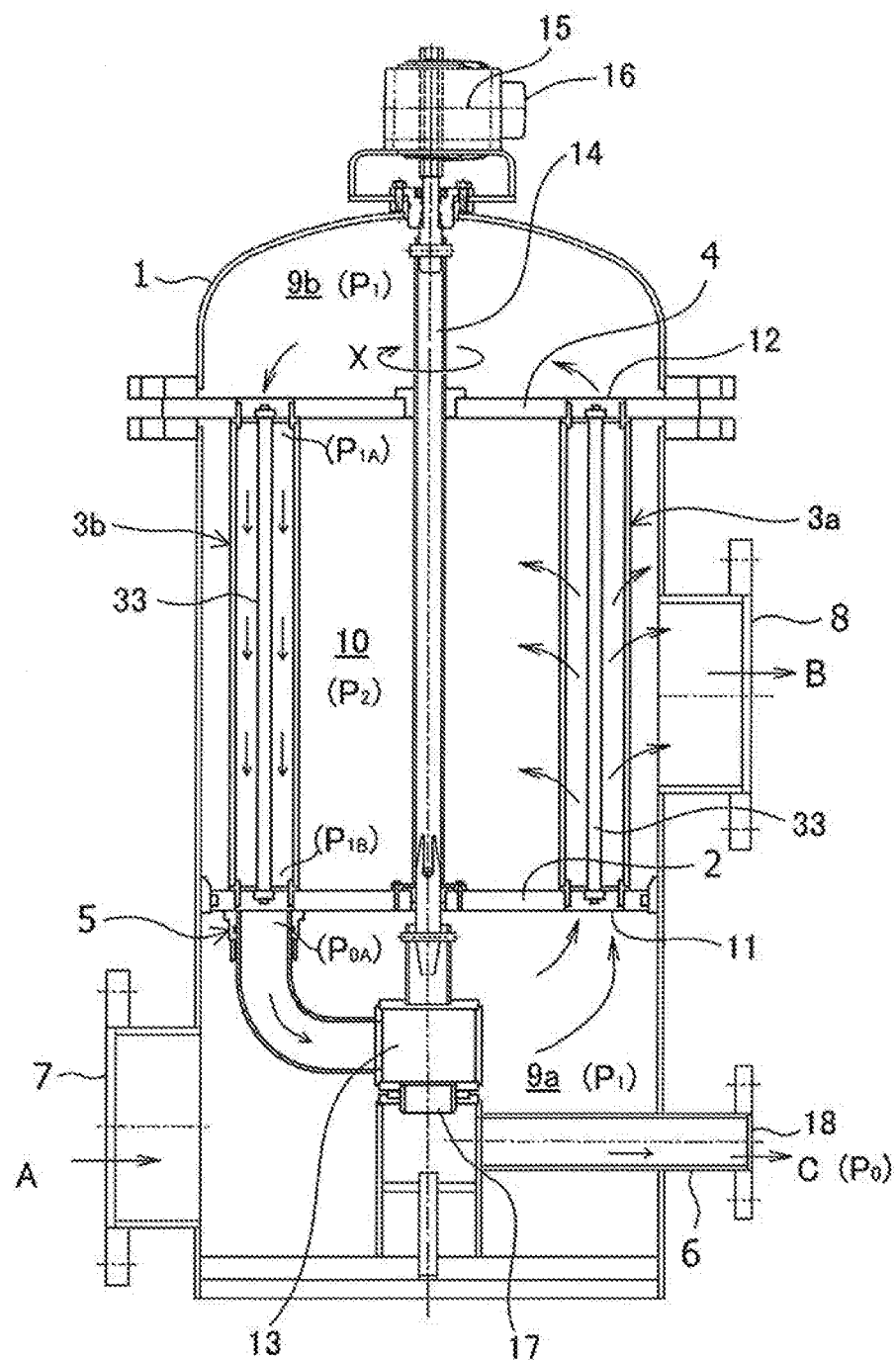
FIG. 5 is a schematic sectional view illustrating a state of the filtration device of FIG. 1 during washing.

FIG. 5 illustrates the fluid pressure (primary pressure $P_1$) in the raw fluid chambers 9a, 9b, pressure ($P_{1A}$) at the inlet of the filter element, pressure ($P_{1B}$) at the outlet of the filter element, pressure ($P_{0A}$) at the inlet of the wash pipe, pressure ($P_0$) on the discharge side of the on-off valve, and the fluid pressure (secondary pressure $P_2$) in the filtered-fluid chamber 10 during washing. The high-low pressure relations are mostly as follows:

$$P_1 \approx P_{1A},\ P_{1B} \approx P_{0A},\ P_{1A} \geq P_2,\ \text{and}\ P_{1B} \leq P_2.$$

However, the pressures ($P_{1A}$, $P_{1B}$) inside the filter element may be higher or lower than the pressure ($P_2$) in the filtered-fluid chamber outside thereof. In other words, in the filtration device of the present invention, since one end of the filter element is open to the raw fluid chamber 9a, 9b during washing, pressure ($P_{1B}$ or $P_{1A}$) inside the filter element is approximated to the pressure $P_1$ in the raw fluid chamber 9a, 9b, and hence the inside and outside pressure difference ($P_2-P_{1B}$ or $P_2-P_{1A}$) of the filter element becomes a small or negative value. Thus, the negative effect of backwashing mentioned above can be prevented.

Next, the operation of the first embodiment of the filtration device structured as mentioned above will be described with reference to FIG. 1 (during filtration) and FIG. 5 (during washing).

During filtration, since the on-off valve in the wash fluid discharging system is closed, the suction of fluid by the wash pipe 5 is not performed and the wash pipe 5 remains stationary without being rotated as illustrated in FIG. 1.

Fluid to be filtered flows from the fluid inlet 7 into the first raw fluid chamber 9a of the casing 1 as indicated by arrow A. This fluid has been pressurized by a pump (such as a centrifugal pump) to have a pressure (primary pressure $P_1$) higher than the pressure (secondary pressure $P_2$) in the filtered-fluid chamber 10. Accordingly, the fluid passes through a filter element 3a from the inside thereof communicating with the first raw fluid chamber 9a, to the filtered-fluid chamber 10 outside of the filter element 3a, to thereby be filtered. Meanwhile, as regards a filter element 3b to which the wash pipe 5 is connected, although fluid cannot flow from the first raw fluid chamber 9a side, fluid can flow through another filter element 3a and the second raw fluid chamber 9b into the filter element 3b, filtration is carried out in the same manner. At this time, foreign substances such as plankton and algae are trapped inside the filter element 3. The fluid filtered while passing through the filter elements 3a, 3b flows out from the fluid outlet 8 to the outside as indicated by arrow B.

On the other hand, during washing, the on-off valve in the wash fluid discharging system is opened to start the suction of fluid by the wash pipe 5 and the wash pipe 5 is rotated by the motor 16 as illustrated in FIG. 5.

Since the inside of the filter element 3b to which the wash pipe 5 is connected is sucked by the wash pipe 5 to reduce pressure, fluid flows from the second raw fluid chamber 9b having the primary pressure, passes through the inside of the filter element 3b in the axial direction at high speed, and flows into the wash pipe 5. At this time, the trapped substances trapped inside the filter element 3b during filtration are removed by this high-speed axial direction flow, and discharged together with wash fluid via the wash pipe 5 and the wash fluid drain pipe 6.

On the other hand, fluid flows from the first raw fluid chamber 9a into the filter element 3a to which the wash pipe 5 is not connected at this time in the same manner as that during filtration to continue filtration.

The wash pipe 5 is rotated to be connected to each filter element 3 sequentially to wash the filter element 3 in the same manner as the filter element 3b. The wash pipe 5 is rotated a predetermined number of times at a predetermined rotating speed to wash all the filter elements 3.

Here, the filter element suitable for use in the filtration device of the present invention is so structured that the openings of mesh (i.e., the mesh of the innermost layer 31a) to filter fluid by allowing the fluid to pass through the filter medium 31 are openings elongated parallel with the axis of the filter medium.

When a filter medium having typical square-shaped openings of mesh is used for filtration, particles having substantially the same size as the openings of the mesh may be stuck in the mesh and the filter element may be clogged without being able to remove the particles depending on the use conditions. There may also be a case in which fibrous foreign substances cling to the grids of mesh and cannot be removed easily.

On the other hand, when the openings of the mesh are formed into elongated openings, particles having substantially the same size as the width of the elongated openings may be stuck in the mesh, but it is unlikely that multiple small particles are stuck in the mesh to clog the mesh. Further, since the stuck particles are pinched only from the width direction of the elongated openings, they are easily removed. Also, fibrous foreign substances are less likely to twine around the elongated openings in the longitudinal direction, and they are less likely to cling thereto. Further, when the direction of elongated openings is set to be parallel with the axis of the filter medium (the axis of the filter element), the particles and fibrous foreign substances stuck in the mesh mentioned above are easy to move in the axial direction and likely to be removed by the axial direction flow during washing of the filtration device of the present invention.

Figure 3A:
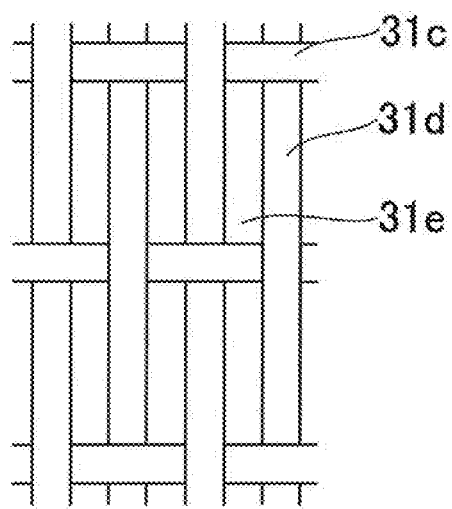
FIG. 3A illustrates an example of a plain woven wire mesh.
Figure 3B:
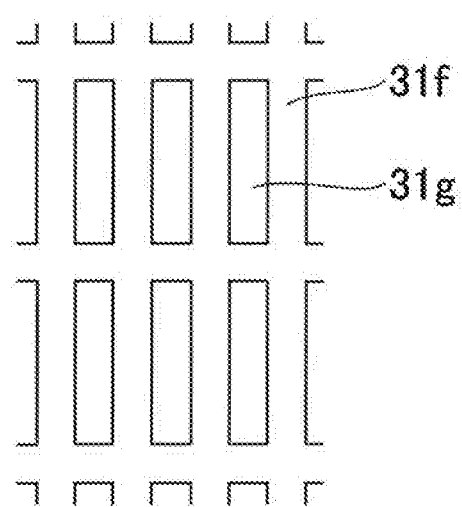
FIG. 3B illustrates an example of punched metal, respectively.

FIGS. 3A and 3B illustrate examples of the structure of the innermost layer 31a of the filter medium having such elongated openings. FIG. 3A illustrates a filter medium composed of wires of wire mesh of plain weave, where the pitch of wire mesh 31c, 31d of the filter medium in the axial direction is made longer than the pitch in the circumferential direction to realize elongated openings 31e. In FIG. 3B, the innermost layer of the filter medium is made of punching metal 31f with elongated openings 31g bored in parallel with the axis of the filter medium.

Any structure other than these can be used as the structure of the innermost layer 31a that realizes the elongated openings. It is preferred that the dimensional ratio of the elongated openings between the long axial direction and the short axial direction be 2 or more, and further preferred that it be 3 or more. Further, outside of the innermost layer 31a having such a structure, a reinforcing mesh 31b of coarse weave may be laminated as needed as mentioned above.

As another filter element suitable for use in the filtration device of the present invention, there is one including a filter medium allowing fluid to pass through to filter the fluid (i.e., the innermost layer 31a) and having a mesh pitch pa in the axial direction of the filter medium larger than a mesh pitch pt in the circumferential direction of the filter medium.

Figure 4A:
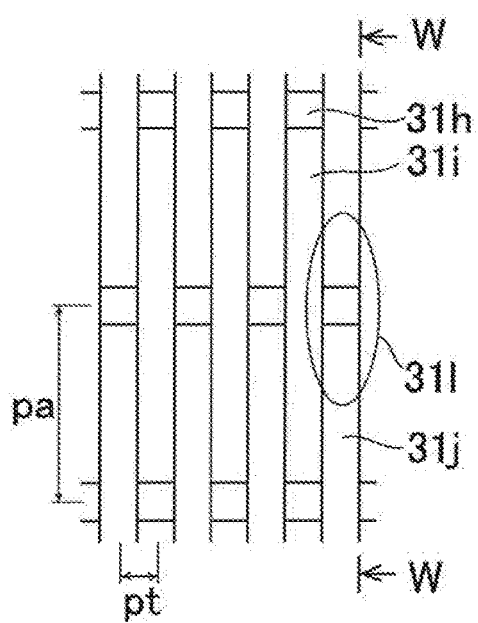
FIG. 4A is a plan view illustrating an example of a plain dutch woven wire mesh.
Figure 4B:
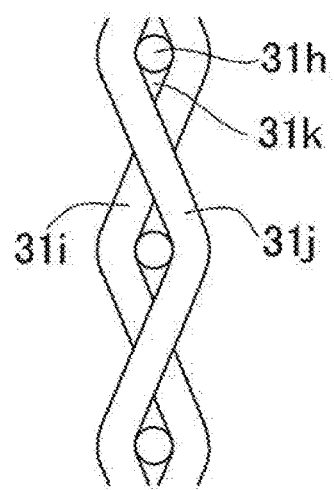
FIG. 4B is a W-W line sectional view of FIG. 2A.

As this example, FIG. 4A illustrates the innermost layer 31a of a filter medium made up of a plain dutch woven mesh. This mesh is formed in such a manner that multiple warp wires 31h (the crosswise direction in the figure) extending in the circumferential direction of the filter medium and spaced with a large pitch pa from each other in the axial direction, and multiple weft wires 31i, 31j (the lengthwise direction in the figure) extending in a direction parallel with the axis of the filter medium and spaced closely with a small pitch pt from each other in the circumferential direction are woven in a dutch weave pattern. In this plain dutch woven mesh, since adjacent weft wires 31i and 31j are woven to wrap around each warp wire 31h from different sides, gaps 31k are formed between these weft wires 31i, 31j and the warp wire 31h (see the cross section in FIG. 4B), and the fluid is filtered while passing through the gaps. At this time, since a groove portion 31l is formed between every other weft wires 31i, 31i or 31j, 31j, particles and foreign substances such as fiber may be stuck in this groove portion 31l. In this filter element, since the direction of weft wires 31i, 31j is set parallel with the axis of the filter medium (the axis of the filter element), the direction of the groove portion 31l is also the axial direction of the filter element. When this filter element is used in the filtration device of the present invention, the particles and the foreign substances such as fiber stuck in the groove 31l mentioned above are easy to move and likely to be removed by the axial direction flow during washing of the filter element.

As the structure of the innermost layer 31a in which the mesh pitch pa of the filter medium in the axial direction of the filter medium is larger than the mesh pitch pt of the filter medium in the circumferential direction of the filter medium, any structure other than the above structure can be used. For example, the same effect can also be obtained by using a twilled dutch woven mesh.

Although use of any of the above filter elements illustrated in FIG. 3 and FIG. 4 in the filtration device of the present invention is effective in achieving the effect of the present invention to wash the filter element using an axial direction flow, the filter element is not limited to those illustrated in FIG. 3 and FIG. 4, and the filtration device of the present invention can achieve the above-mentioned effect even using a conventional filter element.

[Second Embodiment]

This embodiment is an embodiment in which a turbulent flow generating member is provided inside a filter element to make an axial direction flow turbulent in order to enhance the filter washing function.

Figure 2C:
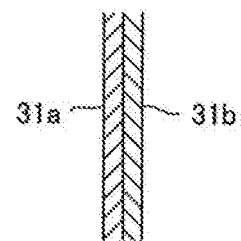
FIG. 2C is an enlarged view of a W part in FIG. 2B.
Figure 6:
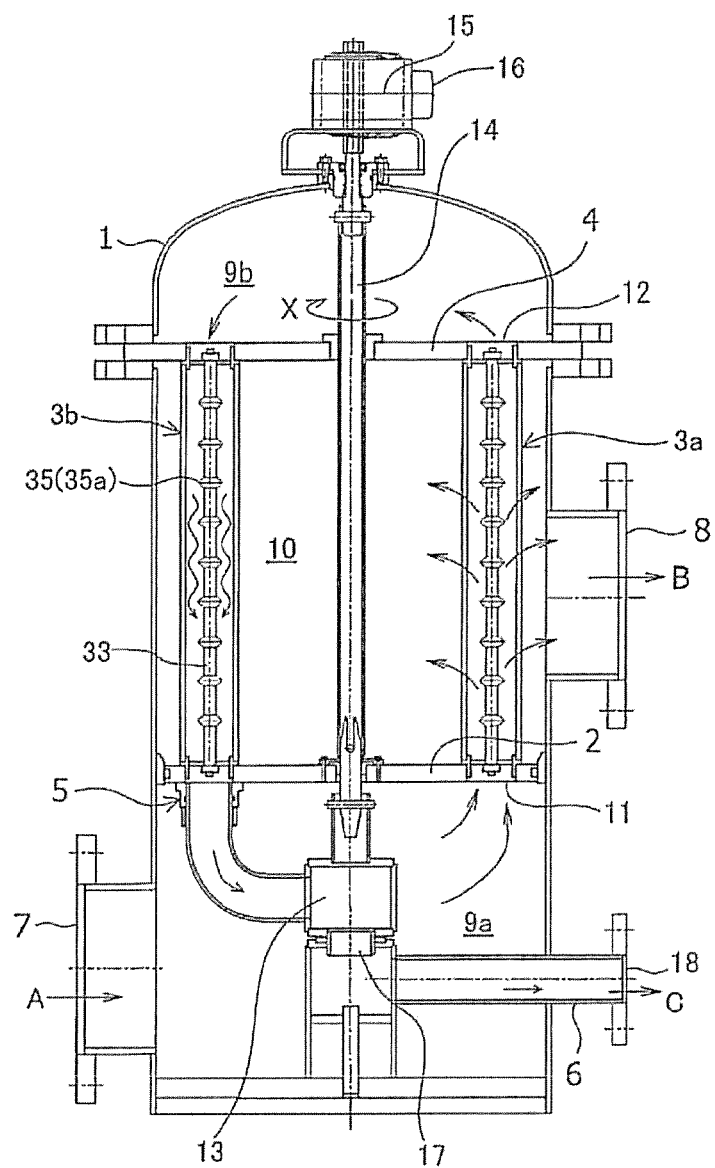
FIG. 6 is a schematic sectional view illustrating a second embodiment of the filtration device according to the present invention.

FIG. 6 is a schematic sectional view illustrating the embodiment, showing a state during washing like in FIG. 5 of the first embodiment. A point different from the first embodiment is only in that a turbulent flow generating member 35 is provided inside the filter element 3. Therefore, constituent elements common to those in the first embodiment illustrated in FIGS. 1 to 3 are given the same reference numerals and descriptions thereof are omitted.

In a filter element 3 to which the wash pipe 5 is connected, although a high-speed axial direction flow is generated from the other end toward the end connected to the wash pipe 5, the axial direction flow is made turbulent by the turbulent flow generating member 35. Trapped substances trapped inside each filter element during filtration are loosened by this turbulent flow and are likely to be peeled off. The peeled, trapped substances are discharged through the wash pipe 5 and the wash fluid drain pipe 6.

Like in the first embodiment, the wash pipe 5 is rotated by the motor 16 during washing, and the wash pipe 5 is connected sequentially to all filter elements to wash all the filter elements. The operation during filtration is the same as that in the first embodiment.

Figure 7:
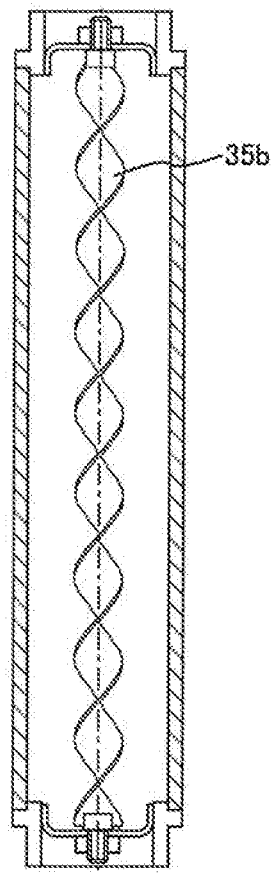
FIG. 7 is a longitudinal sectional view illustrating another example of the filter element in the filtration device of FIG. 6.
Figure 8:
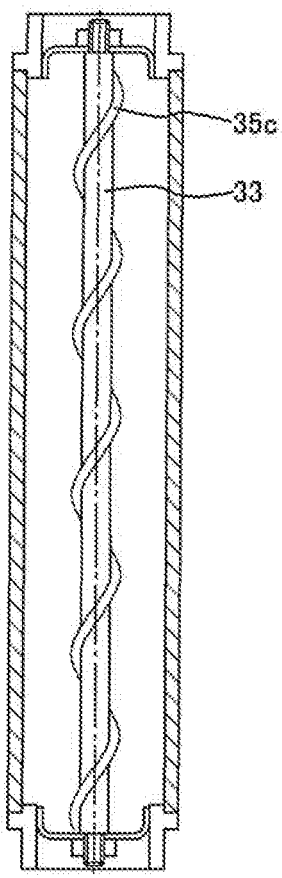
FIG. 8 is a longitudinal sectional view illustrating still another example of the filter element in the filtration device of FIG. 6.

In the example of FIG. 6, the turbulent flow generating member 35 is formed as bead-shaped protrusions 35a provided around a center shaft rod 33 at regular intervals. Other examples include a member formed by twisting a ribbon-like plate 35b as in FIG. 7, and a member formed by spirally wrapping a wire 35c around the center shaft rod 33 as in FIG. 8.

However, the turbulent flow generating member 35 is not limited to these examples, and it may be any member as long as a turbulent flow can be generated. Note that it is preferred that the turbulent flow generating member 35 generate a turbulent flow over the whole length of each filter element and not block the axial direction flow excessively.

This is because, when the axial direction flow is blocked excessively, not only does resistance in the axial direction become large and hence the rate of the axial direction flow become small to reduce the washing effect, but also the fluid pressure on the connection side of the wash pipe 5 inside the filter element 3 becomes lower than the pressure (secondary pressure) in the filtered-fluid chamber 10 due to a pressure drop caused by the resistance in the axial direction to cause the passage (backwashing) of fluid from the outside to the inside of the filter element and hence to further block the axial direction flow so as to reduce the washing effect especially on the other end.

[Third Embodiment]

This embodiment is also an embodiment for carrying out filter washing by the axial direction flow alone, but this embodiment is different from the first embodiment in that the wash pipe is connected to both end sides of the filter element. It is also different in providing another communication passage in addition to the communication passage inside the filter element as communication passages between the first and second raw fluid chambers.

Figure 9:
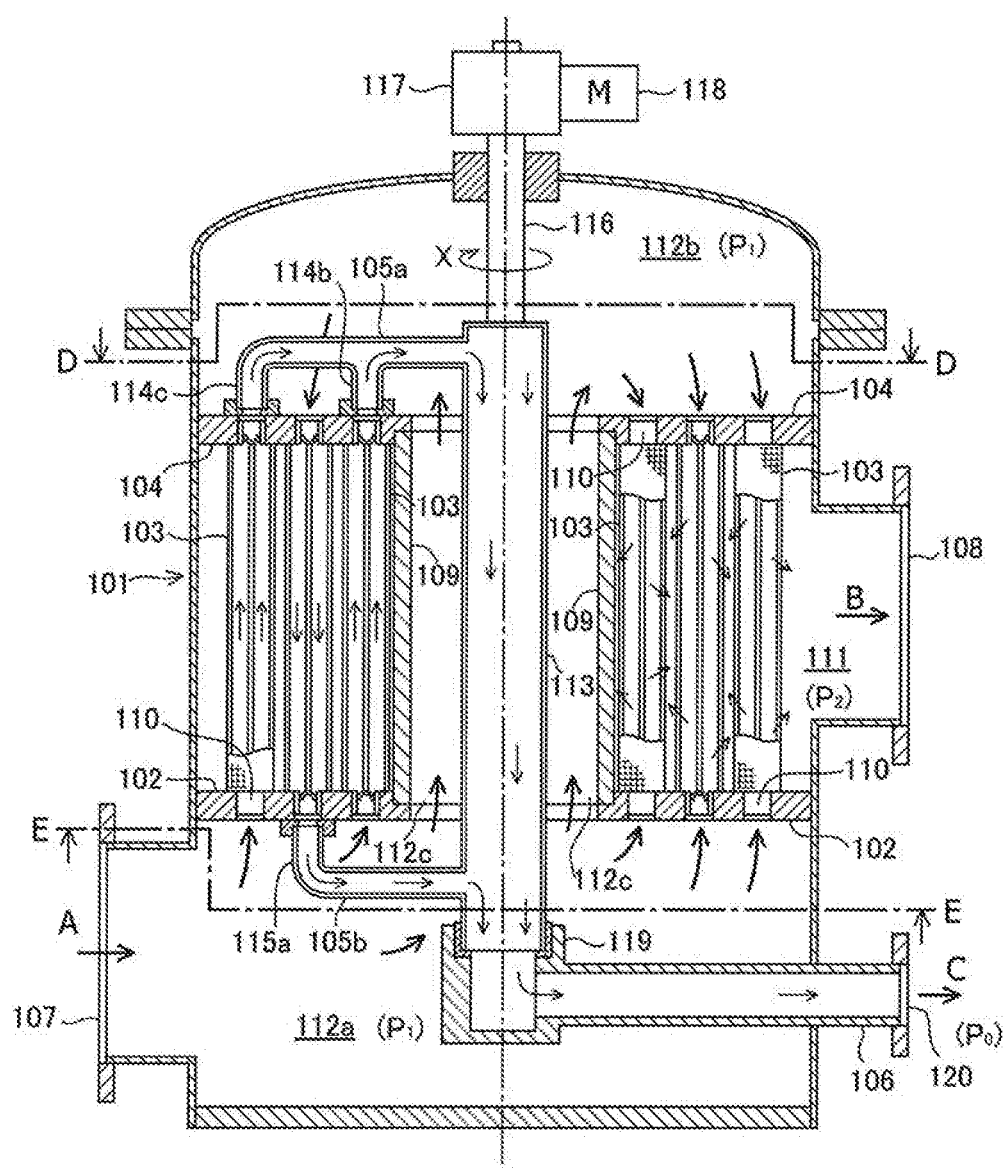
FIG. 9 is a schematic sectional view illustrating a third embodiment of the filtration device according to the present invention.
Figure 10:
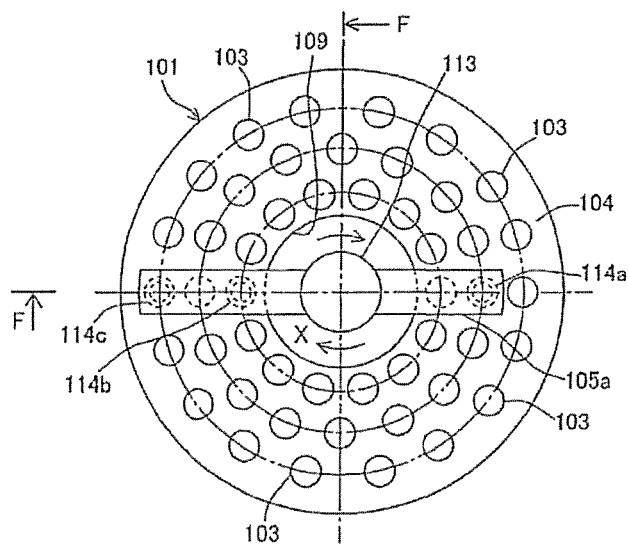
FIG. 10 is a D-D line sectional view of the filtration device of FIG. 9.
Figure 11:
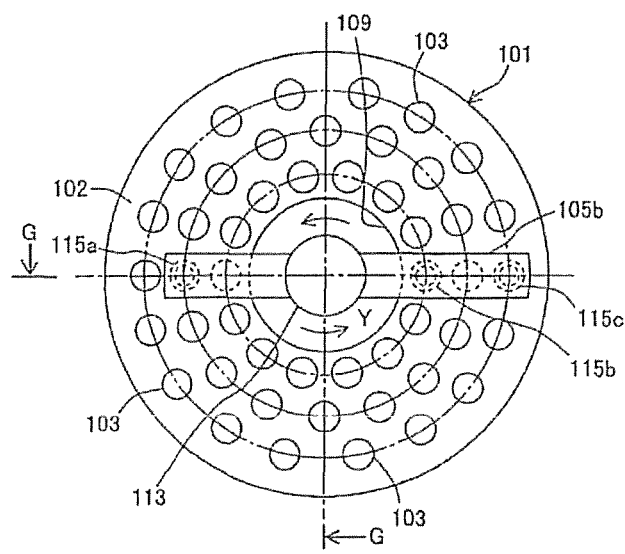
FIG. 11 is an E-E line sectional view of the filtration device of FIG. 9.

FIG. 9 is a schematic sectional view illustrating a state of a filtration device of the embodiment during washing, FIG. 10 is a D-D line sectional view of FIG. 9, and FIG. 11 is an E-E line sectional view of FIG. 9. Note that FIG. 9 corresponds to an F-F line sectional view of FIG. 10.

This filtration device is also to filter vessel's ballast water or the like, and is configured to include a casing 101, a first partition wall 102, filter elements 103, a second partition wall 104, wash pipes 105a, 105b, and a wash fluid drain pipe 106.

Doughnut disk-like mounting plates (first partition wall and second partition wall) 102, 104, each having a circular opening at the center are mounted in a lower part and an upper part inside the casing 101, and a cylindrical wall 109 is provided vertically along the circumferential edges of the central openings of the mounting plates 102, 104. Then, through holes 110 are formed in multiple positions of the mounting plates 102, 104. In this state, a doughnut-like cylindrical space surrounded by the inner wall of the casing 101, the mounting plates 102, 104, and the cylindrical wall 109 is formed.

In the doughnut-like cylindrical space surrounded by the inner wall of the casing 101, the mounting plates 102, 104, and the cylindrical wall 109, multiple filter elements 103 are provided in parallel with one another. The filter elements 103 are to allow target fluid to pass through from the inside toward the outside and to filter the fluid like in the filter element 3 of the first embodiment illustrated in FIG. 2. Both ends of each filter element 103 in the longitudinal direction are open, and the openings at both ends are coupled to the through holes 110 bored in the mounting plates 102, 104, respectively, and each filter element 103 is disposed vertically inside the casing 101. In this case, the doughnut-like cylindrical space surrounded by the inner wall of the casing 101, the mounting plates 102, 104, and the cylindrical wall 109 forms a filtered-fluid chamber 111 in which filtered fluid is stored. On the other hand, fluid before being filtered is stored all in spaces inside the casing 101 on the downside of the mounting plate 102, on the upside of the mounting plate 104, and inside of the cylindrical wall 109. Among the spaces, the space on the downside of the mounting plate 102 is called as a first raw fluid chamber 112a, the space on the upside of the mounting plate 104 is called as a second raw fluid chamber 112b, and the inside of the cylindrical wall 109 forms a communication passage 112c between them.

As illustrated in FIG. 9 to FIG. 11, the multiple filter elements 103 internally communicate with the first raw fluid chamber 112a and the second raw fluid chamber 112b, and are arranged in concentric circular arrangement inside the filtered-fluid chamber 111, for example, in three rows.

Among the multiple filter elements 103, wash nozzles 114a to 114c of the first wash pipe 105a are connected to openings at the upper ends of some of the filter elements 103, and wash nozzles 115a to 115c of the second wash pipe 105b are connected to openings at the lower ends of other some of the filter elements 103. These wash pipes 105a, 105b each draws in the fluid inside the filter element 103 to cause an axial direction flow from the raw fluid chamber connected to the other end of the filter element via the end toward an end at which each of the wash pipes is connected, to peel off trapped substances adhering to the inside.

In FIG. 9, from the upper end of a hollow discharge pipe 113 rotatably provided in a central portion of the casing 101, the first wash pipe 105a extends to the left in the radial direction, and wash nozzles 114b, 114c thereof are connected to the upper ends of the first and third filter elements 103 from the center through the through holes 110. Although not illustrated in FIG. 9 because FIG. 9 corresponds to the F-F line sectional view of FIG. 10, the first wash pipe 105a actually also extends to the right as illustrated in FIG. 10, and the wash nozzle 114a is connected to the upper end of the second filter element 103 from the center through the through hole 110.

In FIG. 9, the second wash pipe 105b extends from the lower end of the hollow discharge pipe 113 to the left in the radial direction, and a wash nozzle 115a thereof is connected to the lower end of the second filter element 103 from the center through the through hole 110. However, although not illustrated in FIG. 9 since FIG. 9 also corresponds to the G-G line sectional view of FIG. 11, the second wash pipe 105b actually also extends to the right as illustrated in FIG. 11, and wash nozzles 115b, 115c thereof are connected to the lower ends of the first and third filter elements 103 from the center through the through holes 110.

The first wash pipe 105a and the second wash pipe 105b are driven by a motor 118 through a shaft 116 and a gear box 117 to rotate together with the discharge pipe 113. For example, the first and second wash pipes 105a and 105b are rotated in a direction of arrow X (Y direction in FIG. 11) so that the wash nozzles 114a, 114b, and 114c of the first wash pipe 105a corresponding to respective concentric circles will be connected sequentially to the upper ends of the multiple filter elements 103 arranged in concentric circular arrangement. Further, the wash nozzles 115a, 115b, and 115c of the second wash pipe 105b corresponding to respective concentric circles are connected sequentially to the lower ends of these filter elements 103.

In this case, the wash nozzles 114a, 114b, and 114c of the first wash pipe 105a are arranged in positions shifted by 180 degrees to the wash nozzles 115a, 115b, and 115c of the second wash pipe 105b, respectively. Thus, when the first wash pipe 105a and the second wash pipe 105b are rotated, the wash nozzle 114 on the side of the first wash pipe 105a and the wash nozzle 115 on the side of the second wash pipe 105b are connected to both ends (upper end and lower end) of each filter element 103 at timings shifted by 180 degrees.

However, the arrangement angle between the first wash pipe 105a and the second wash pipe 105b is not limited to 180 degrees, and it may be any angle other than zero degrees. For example, it may be 90 degrees. In other words, the arrangement angle may be any angle as long as the wash nozzles of the first and second wash pipes 105a, 105b are not connected at both ends of the same filter element at the same time.

The lower end part of the discharge pipe 113 as the discharge side of the wash pipes 105a, 105b is rotatably connected to the wash fluid drain pipe 106 while keeping the seal. The wash fluid drain pipe 106 is released to atmospheric pressure ($P_0$) through an on-off valve, not illustrated.

Next, the operation (use situation) of the filtration device thus structured will be described with reference to FIGS. 9 to 11.

During filtration, although not illustrated, the rotation of the wash pipes is stopped, the on-off valve, not illustrated, connected to the wash fluid drain pipe 106 is closed, and the suction of fluid by the wash pipes 105a, 105b is thereby stopped. The target fluid flows from the fluid inlet 107 as indicated by arrow A and flows into the multiple filter elements 103 provided in parallel with one another between the lower and upper mounting plates 102, 104, from the openings at both ends (upper end and lower end) of each filter element 103. Since the fluid is pressurized by a pump (such as a centrifugal pump) to have a primary pressure ($P_1$) higher than the secondary pressure ($P_2$), the fluid flows from both ends of filter elements that are not connected to the wash pipes 105a, 105b into the filter elements, and passes through from the inside to the outside of each filter element so that the fluid will be filtered. On the other hand, into each of filter elements connected to the wash pipes 105a, 105b, the fluid flows from an end not connected to the wash pipe, and passes through from the inside to the outside of the filter elements so that the fluid will be filtered. The fluid that has passed through the filter element 103 and has been filtered flows out from a fluid outlet 108 to the outside as indicated by arrow B.

During washing, as illustrated in FIG. 9, the wash pipes 105a, 105b are rotated and the valve, not illustrated, connected to the wash fluid drain pipe 106 is opened, and fluid is thereby drawn by the wash pipes 105a, 105b. Therefore, in the filter elements 103 connected to the wash nozzles 114b, 114c of the upper wash pipe 105a, the fluid flows in from the first raw fluid chamber 112a on the other end side (downside), flows through the inside of the filter elements in the axial direction, and is drawn into the wash pipe 105a. In the filter element 103 connected to the wash nozzle 115a of the lower wash pipe 105b, the fluid flows in from the second raw fluid chamber 112b on the other end side (upside), flows through the inside of the filter element in the axial direction, and is drawn into the wash pipe 105b. Trapped substances trapped inside each filter element during filtration are peeled off by this axial direction flow, pass through the wash pipe 105a or 105b and the wash fluid drain pipe 106, and are discharged from a discharge outlet 120 as indicated by arrow C.

As illustrated in FIG. 10, the upper wash pipe 105a is rotated clockwise (in the X direction) by the motor 118 when viewed from above, and any one of the wash nozzles 114a to 114c is connected from above to each filter element once in each rotation to wash the filter element from below using an upward axial direction flow. Simultaneously, as illustrated in FIG. 11, the lower wash pipe 105b is rotated counterclockwise (in the Y direction) when viewed from below, and any one of the wash nozzles 115a to 115c is connected from below to each filter element once in each rotation to wash the filter element from above using a downward axial direction flow. Since the connection to each filter element is made at timings shifted by 180 degrees, each filter element is washed out once by an upward axial direction flow from below and washed out once by a downward axial direction flow from above while the wash pipes 105a, 105b are rotated once. Then, the wash pipes 105a, 105b are rotated a predetermined number of times to carry out washing.

During the washing operation mentioned above, into filter elements 103 in a period of not being connected to the wash nozzles 114, 115 of the wash pipes 105a, 105b, fluid flows from both ends of each filter element and passes through from the inside to the outside to be filtered in the same manner as during normal filtration.

[Fourth Embodiment]

This embodiment is to provide a trapped substance removing tool inside each filter element, where the trapped substance removing tool is reciprocated between both ends by an axial direction flow to scrape off trapped substances in order to enhance the washing effect.

Figure 12:
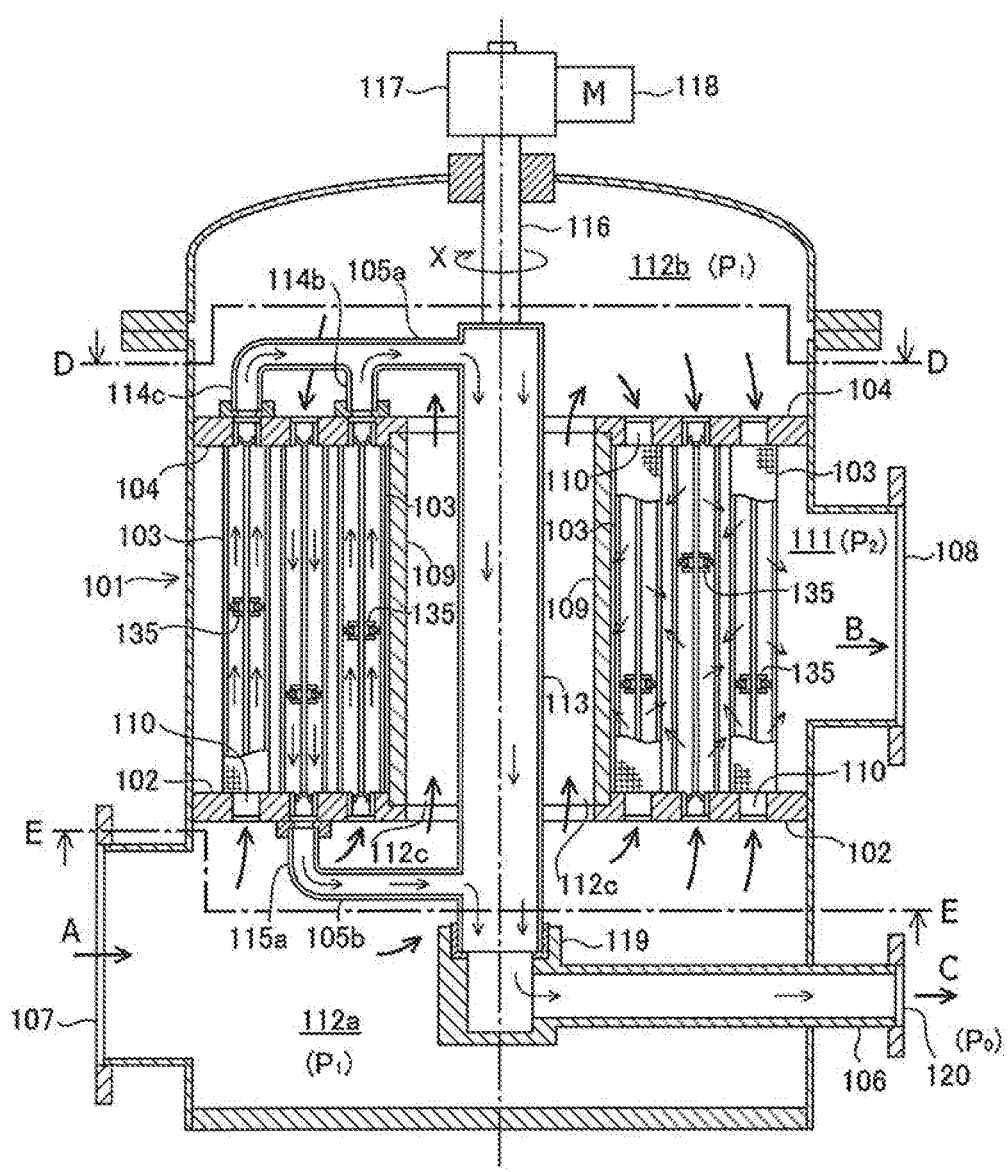
FIG. 12 is a schematic sectional view illustrating a fourth embodiment of the filtration device according to the present invention.

FIG. 12 is a schematic sectional view illustrating the embodiment of a filtration device, showing a state during washing. The filtration device is a modification of the device of the third embodiment, and only a difference from the third embodiment is that a trapped substance removing tool 135 is provided inside each filter element 103. Therefore, constituent elements common to those in the third embodiment illustrated in FIGS. 9 to 11 are given the same reference numerals to omit the description thereof.

Figure 13:
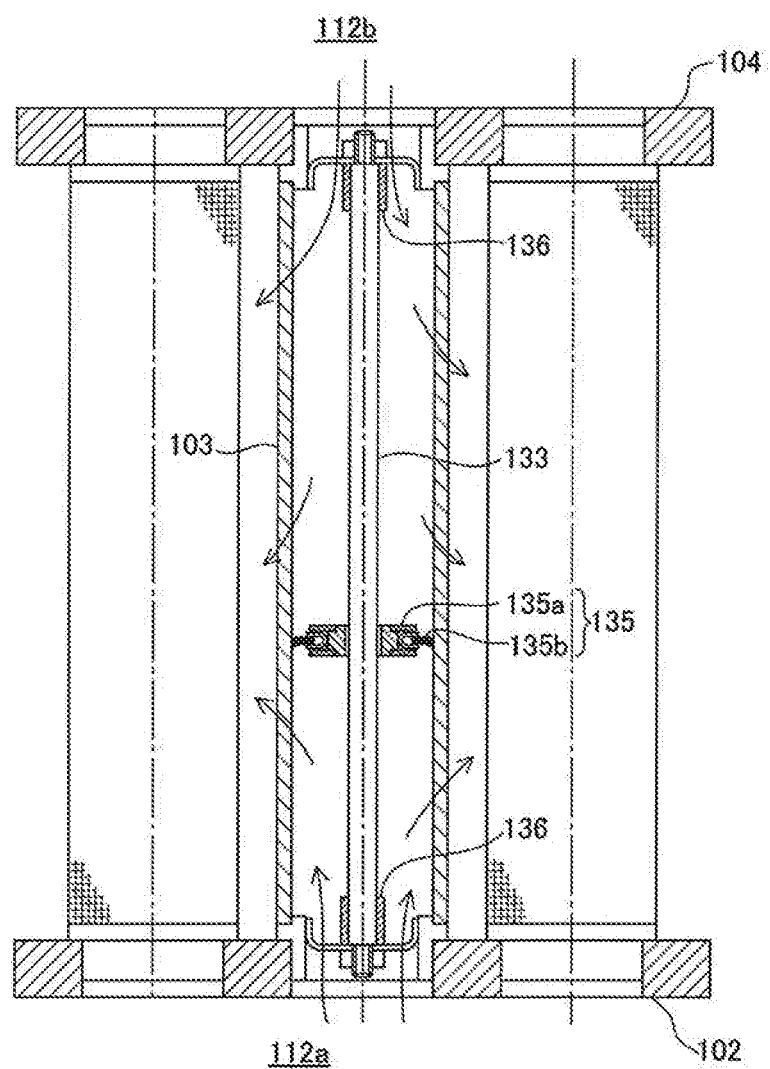
FIG. 13 is a longitudinal sectional view illustrating a state of a filter element in the filtration device of FIG. 12 during filtration.

The structure of a filter element 103 of this filtration device is illustrated in FIG. 13. FIG. 13 is a longitudinal sectional view illustrating a state of the filter element 103 during filtration together with the mounting plates 102, 104 connected and adjacent filter elements. The structure of the filter element 103 is the same as the filter element 3 or 103 in the first or third embodiment except that the filter element 103 has the trapped substance removing tool 135. It is particularly preferred that the openings of mesh of a filter medium be openings elongated parallel with the axis of the filter medium because it is easier for the trapped substance removing tool 135 to remove even foreign substances stuck in the mesh. It is also preferred that the mesh pitch of the filter medium in the axial direction of the filter medium be larger than the mesh pitch of the filter medium in the circumferential direction of the filter medium because it is easier for the trapped substance removing tool 135 to remove the foreign substances stuck in the mesh. This trapped substance removing tool 135 moves in the axial direction inside the filter element 103 by a flow of fluid in the axial direction caused during filtration or during washing so that the outer circumferential part of the trapped substance removing tool 135 will slidingly contact the inner circumferential surface of the filter element 103 to remove trapped substances. The trapped substance removing tool 135 is formed into a removal brush as illustrated in FIG. 13.

This removal brush 135 moves up and down inside the filter element 103 along a center shaft rod 133 thereof, and is made up by planted bristles 135b of the brush in an outer circumferential part of a brush body 135a. The brush body 135a is formed in the shape of a doughnut disk having a hole formed at the center thereof to fit the center shaft rod 133 therein, having an outer diameter smaller than the inner diameter of the filter element 103, and having a predetermined thickness. The bristles 135b of the brush having a bristle tip capable of slidingly contacting the inner circumferential surface of the filter element 103 are planted in the outer circumferential part of this brush body 135a in the shape of a ring. The length of the bristles 135b of the brush needs to be set so that the tip of the bristles 135b of the brush will contact at least the inner circumferential surface of the filter element 103 with a certain degree of pressure.

The material of the bristles 135b of the brush may be any material as long as it is generally used as bristles of a brush, such as natural or synthetic fiber, metal wires made of steel, copper, or brass, or the like. Note that the bristles 135b of the brush have flexibility to a certain extent that it is flexed by the pressure of fluid flowing inside of the filter element 103. This causes a gap between the inner circumferential surface of the filter element 103 and the tip of the bristles 135b of the brush when the bristles 135b of the brush are flexed by the fluid pressure, allowing the fluid to pass by.

As illustrated in FIG. 13, stoppers 136 are attached to the upper end and lower end of the center shaft rod 133 inside the filter element 103. The stoppers 136 are to stop the movement of the removal brush 135 at the upper and lower ends when the removal brush 135 moves up and down inside the filter element 103 along the center shaft rod 133 thereof. It is more preferred that the material of the stoppers 136 can absorb impact, such as rubber or a spring.

Figure 14:
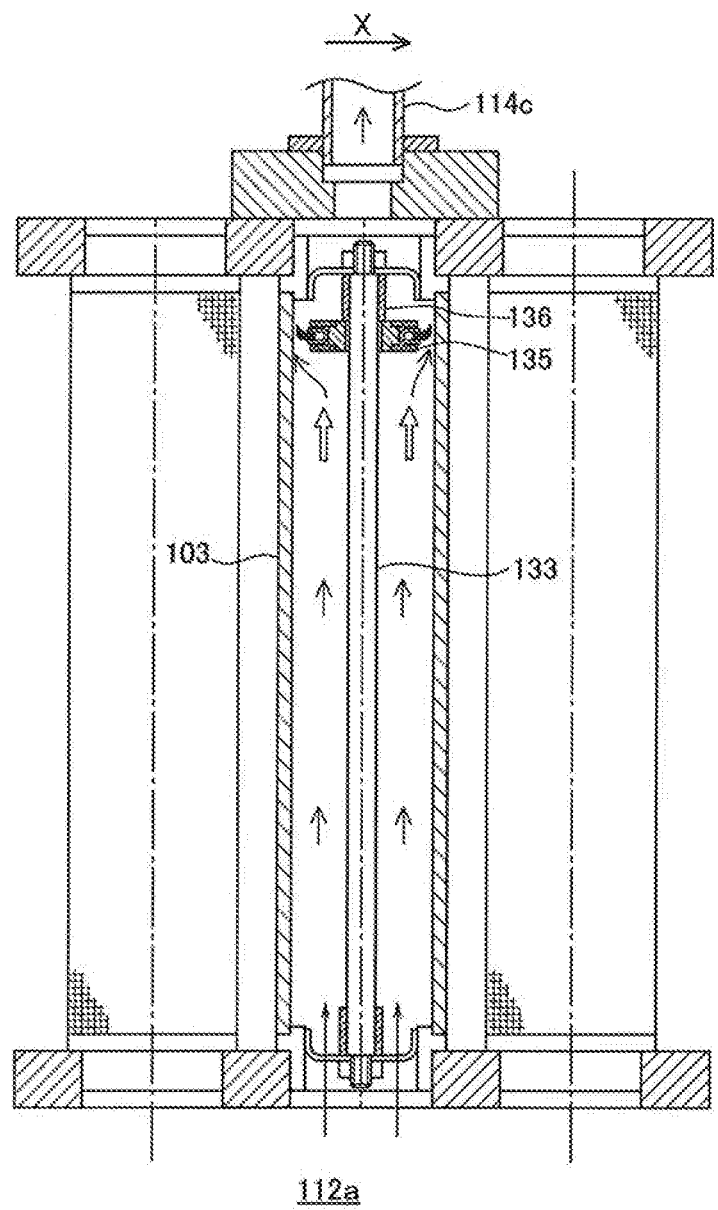
FIG. 14 is a longitudinal sectional view illustrating a state of the filter element in the filtration device of FIG. 12 during washing by an upward axial direction flow.
Figure 15:
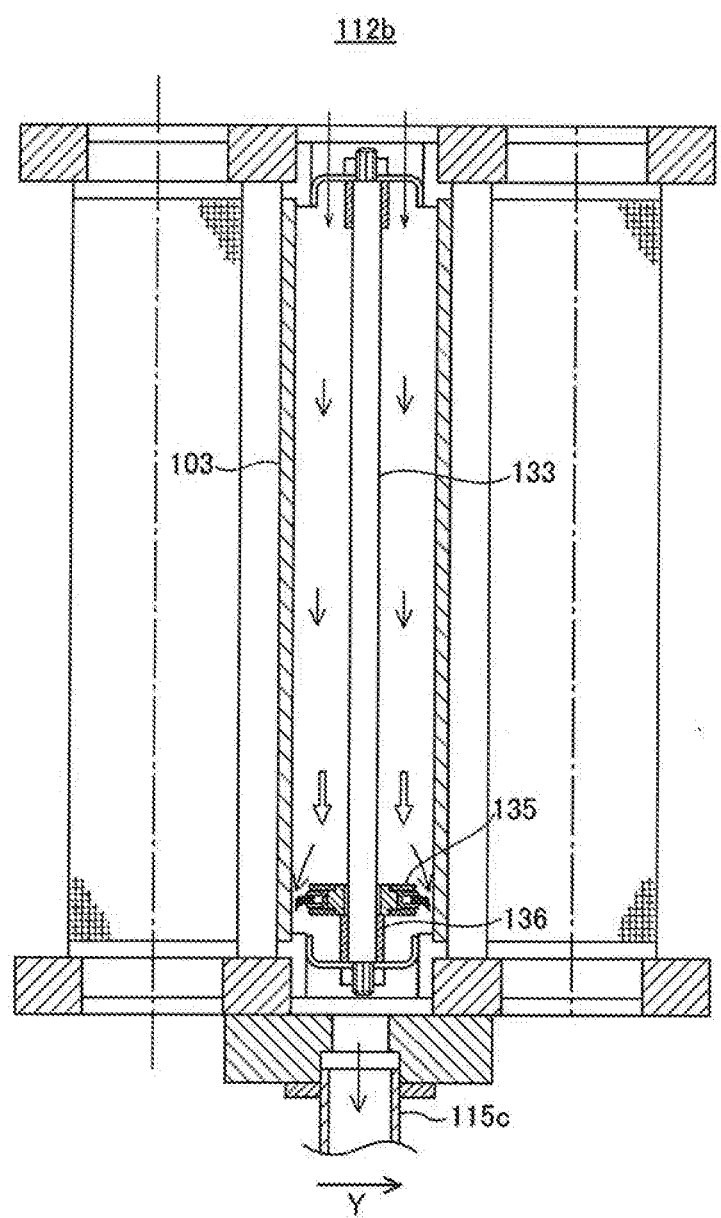
FIG. 15 is a longitudinal sectional view illustrating a state of the filter element in the filtration device of FIG. 12 during washing by a downward axial direction flow.

Next, the operation of the filtration device thus formed according to the fourth embodiment during filtration and during washing will be described with reference to FIG. 13 to FIG. 15 by focusing attention on the filter element 103 in FIG. 13. FIG. 14 and FIG. 15 are longitudinal sectional views illustrating a state of the filter element103 during washing, which also illustrate wash nozzles, the mounting plates 102, 104 connected, and adjacent filter elements like in FIG. 13. Here, it is assumed that the filter element 103 is the third filter element from the center, which is to be connected to the wash nozzle 114c, 115c. Filter elements on other rows are also connected to corresponding wash nozzles and operated in the same manner.

FIG. 13 illustrates a state in which fluid is filtered in the filter element 103 when the filtration device is carrying out the filtration operation or when the wash nozzles 114c, 115c of the first and second wash pipes 105a, 105b are not caught in the openings at the upper end and lower end of the filter element 103 while the filtration device is carrying out the washing operation. In this state, fluid flows into the filter element 103 from the first raw fluid chamber 112a and the second raw fluid chamber 112b via the openings at the upper end and lower end of the filter element 103, and is filtered while passing through from the inside to the outside. In this case, the removal brush 135 provided inside the filter element 103 is pushed by unfiltered fluid flowing from the openings at the upper end and lower end of the filter element 103, and stopped at a position in which pressure of a flow inside the filter element 103 is balanced, for example, in an intermediate portion.

FIG. 14 illustrates a state in which the first and second wash pipes 105a, 105b have rotated in the direction of arrow X in FIG. 10 (in the direction of arrow Y in FIG. 11) from the state of FIG. 13 so that the wash nozzle 114c of the first wash pipe 105a have caught in the opening at the upper end of the filter element 103 so as to carry out washing. In this state, an axial direction flow from the first raw fluid chamber 112a connected to the lower end of the filter element 103 toward the opening at the upper end thereof via the opening at the lower end is formed by the drawing in action of the wash nozzle 114c. This upward axial direction flow pushes up the removal brush 135 inside the filter element 103 along the center shaft rod 133, and the bristles 135b of the brush around the outer circumferential part slidingly contact the inner circumferential surface of the filter element 103 to remove trapped substances adhering to the surface while being pushed up to the uppermost end, and is stopped in contact with the stopper 136 at the upper end.

The bristles 135b of the removal brush 135 stopped in contact with the stopper 136 are flexed by the action of the axial direction flow to form a gap between the bristle 135b and the inner circumferential surface of the filter element 103 so as to allow wash fluid to flow into the wash nozzle 114c via the opening at the upper end. Thus, the trapped substances removed from the inner circumferential surface of the filter element 103 by the movement of the removal brush 135 and the action of the axial direction flow flowing into the first wash pipe 105a through the wash nozzle 114c, are sent through the discharge pipe 113 illustrated in FIG. 12 to the wash fluid drain pipe 106, and discharged to the outside.

After that, when the first wash pipe 105a is further rotated and the wash nozzle 114c thereof moves out of the opening at the upper end of the filter element 103, the drawing in from the wash nozzle is stopped. Thus, like in FIG. 13, fluid flows into the filter element 103 from the openings at the upper end and lower end of the filter element 103, and is filtered while passing through from the inside toward the outside. In this case, the removal brush 135 provided inside the filter element 103 is pushed by unfiltered fluid flowing from the openings at the upper end and lower end, and stopped at a position in which pressure of a flow inside the filter element 103 is balanced, for example, in an intermediate portion.

FIG. 15 illustrates a state in which the first and second wash pipes 105a, 105b have further rotated so that the wash nozzle 115c of the second wash pipe 105b are caught in the opening at the lower end of the filter element 103 so as to carry out washing.

In this state, an axial direction flow from the second raw fluid chamber 112b connected to the upper end of the filter element 103 toward the opening at the lower end thereof via the opening at the upper end is formed by the drawing in action of the wash nozzle 115c.

This downward axial direction flow pushes down the removal brush 135 inside the filter element 103 along the center shaft rod 133, and the bristles 135b of the brush around the outer circumferential part slidingly contact the inner circumferential surface of the filter element 103 to remove trapped substances adhering to the surface while being pushed down to the lowermost end, and is stopped in contact with the stopper 136 at the lower end.

The bristles 135b of the removal brush 135 stopped in contact with the stopper 136 are flexed by the action of the axial direction flow to form a gap between the bristle 135b and the inner circumferential surface of the filter element 103 so as to allow wash fluid to flow into the wash nozzle 115c via the opening at the lower end. Thus, the trapped substances removed from the inner circumferential surface of the filter element 103 by the movement of the removal brush 135 and the action of the axial direction flow illustrated in FIG. 15 flow into the second wash pipe 105b through the wash nozzle 115c. Then, the removed, trapped substances and the wash fluid are sent to the wash fluid drain pipe 106 through the discharge pipe 113 illustrated in FIG. 12, and discharged to the outside.

After that, when the second wash pipe 105b has further rotated and the wash nozzle 115c thereof moves out of the opening at the lower end of the filter element 103, the drawing in from the wash nozzle is stopped. Thus, like in FIG. 13, fluid flows into the filter element 103 from the openings at the upper end and lower end of the filter element 103, and is filtered while passing through from the inside toward the outside. In this case, the removal brush 135 provided inside the filter element 103 is pushed by unfiltered fluid flowing from the openings at the upper end and lower end, and stopped at a position in which pressure of a flow inside the filter element 103 is balanced, for example, in an intermediate portion.

Subsequently, the upward and downward axial direction flows illustrated in FIG. 13 to FIG. 15 and the reciprocating motion of the removal brush 135 by the actions of the axial direction flows are repeated in the filter elements 103 to carry out washing.

Like in the first to third embodiments, the wash pipes 105a and 105b are rotated by the motor 118 during washing to be connected sequentially to all filter elements to wash all the filter elements. The operation during filtration is the same as that in the first to third embodiments.

Although the filtration devices having multiple filter elements 3, 103 are illustrated in the first to fourth embodiments mentioned above, the number of filter elements in the filtration devices of the present invention may be one. Further, the structure may be such that, instead of the rotational wash pipe, a non-rotational wash pipe integrated with a wash fluid drain pipe is provided to be always connected to one end of the filter element so that, during filtration, fluid will be supplied from the other end of the filter element and filtered while passing through from the inside to the outside, and during washing, the fluid will be drawn in by the wash pipe from the one end to cause an axial direction flow from the other end to the one end in order to carry out washing.

In the description of the fourth embodiment, the example of the removal brush is illustrated as the trapped substance removing tool 135, but the present invention is not limited thereto, and the tool may be a scraper or the like, formed into a blade shape or a spatula shape and made of metal, resin, or rubber, as long as it moves in the axial direction inside the filter element 3, 103 by the action of a flow of fluid during filtration or during washing so that an outer circumferential member can slidingly contact the inner circumferential surface of the filter element 3, 103 to remove trapped substances.

REFERENCE SYMBOL LIST

1 . . . casing
2 . . . first partition wall
3, 3a, 3b . . . filter element
31 . . . filter medium
31c, 31e . . . elongated opening
4 . . . second partition wall
5 . . . wash pipe
6 . . . wash fluid drain pipe
7 . . . fluid inlet
8 . . . fluid outlet
9a . . . first raw fluid chamber
9b . . . second raw fluid chamber
10 . . . filtered-fluid chamber
11 . . . through hole
12 . . . through hole
35, 35a, 35b, 35c . . . turbulent flow generating member
101 . . . casing
102 . . . first partition wall (mounting plate)
103 . . . filter element
104 . . . second partition wall (mounting plate)
105, 105a, 105b . . . wash pipe
106 . . . wash fluid drain pipe
107 . . . fluid inlet
108 . . . fluid outlet
109 . . . cylindrical wall
110 . . . through hole
111 . . . filtered-fluid chamber
112a . . . first raw fluid chamber
112b . . . second raw fluid chamber
112c . . . communication passage
135 . . . trapped substance removing tool (removal brush)
pa . . . mesh pitch in axial direction
pt . . . mesh pitch in circumferential direction

The invention claimed is:

1. A filtration device comprising:
a casing having a fluid inlet into which fluid flows from outside and a fluid outlet from which fluid filtered inside thereof flows to the outside;
a first partition wall which partitions the inside of the casing into a first raw fluid chamber communicating with the fluid inlet to store fluid before being filtered, and a filtered-fluid chamber communicating with the fluid outlet to store filtered fluid;
a plurality of filter elements provided in parallel inside the filtered-fluid chamber, each filter element having a cylindrical shape open at both ends and provided in such a manner that one end thereof is fitted and held in a through hole formed in the first partition wall, and inside thereof communicates with the first raw fluid chamber to let fluid pass through from the inside to the outside so as to filter the fluid;
a second partition wall provided on the other end side of each filter element in parallel with the first partition wall, which fits and holds the other end of each filter element in a through hole to form a second raw fluid chamber communicating with the first raw fluid chamber via inside of each filter element, and partitions the inside of the casing into the filtered-fluid chamber and a second raw fluid chamber;
a wash pipe connected to at least one end side of each filter element to cause fluid to flow in an axial direction of the filter element from the first or second raw fluid chamber via the other end of the filter element to wash the filter element; and
a wash fluid drain pipe connected to a discharge side of the wash pipe to discharge, to the outside of the casing, trapped substances removed by washing the filter elements,
wherein the other end of each filter element connected to the wash pipe and being washed is always open to the first or second raw fluid chamber, and
wherein a trapped substance removing tool is provided inside each filter element to move between both ends of the inside of the filter element by an axial direction flow of fluid caused during washing, that strips the trapped substances, so that an outer circumferential part thereof slidingly contacts an inner circumferential surface of the filter element to remove trapped substances.

2. The filtration device according to claim 1, wherein the wash pipe is provided on both end sides of the filter element and connected to either one of the ends of the filter element at different timing.

3. The filtration device according to claim 1, wherein each filter element has a filter medium having a cylindrical shape open at both ends, wherein openings of mesh of the filter medium, which lets fluid pass through to filter the fluid, are elongated openings parallel with an axis of the filter element.

4. The filtration device according to claim 1, wherein each filter element has a filter medium having a cylindrical shape open at both ends, wherein a mesh pitch of the filter medium in an axial direction of the filter medium, which lets fluid pass through to filter the fluid, is larger than a mesh pitch of the filter medium in a circumferential direction of the filter medium.

5. A filtration device comprising:
a casing having a fluid inlet into which fluid flows from outside and a fluid outlet from which fluid filtered inside thereof flows to the outside;
a first partition wall which partitions the inside of the casing into a first raw fluid chamber communicating with the fluid inlet to store fluid before being filtered, and a filtered-fluid chamber communicating with the fluid outlet to store filtered fluid;
a filter element having a cylindrical shape open at both ends and provided inside the filtered-fluid chamber in such a manner that one end thereof is fitted and held in a through hole formed in the first partition wall, and inside thereof communicates with the first raw fluid chamber to let fluid pass through from the inside to the outside so as to filter the fluid;
a second partition wall provided on the other end side of the filter element in parallel with the first partition wall, which fits and holds the other end of the filter element in a through hole to form a second raw fluid chamber communicating with the first raw fluid chamber via the inside of the filter element, and partitions the inside of the casing into the filtered-fluid chamber and a second raw fluid chamber;
a wash pipe provided on both end sides of the filter element and connected to at least one end side either one of the ends of the filter element at different timing to cause fluid to flow in an axial direction of the filter element from the first or second raw fluid chamber via the other end of the filter element to wash the filter element; and
a wash fluid drain pipe connected to a discharge side of the wash pipe to discharge, to the outside of the casing, trapped substances removed by washing the filter element, and
a cylindrical wall having both ends connected to circumferential edges of central openings of the first and second partition walls, and the inside of which forms a communication passage between the first and second raw fluid chambers,
wherein the other end of the filter element connected to the wash pipe and being washed is always open to the first or second raw fluid chamber, and
wherein a trapped substance removing tool is provided inside the filter element to move between both ends of the inside of the filter element by an axial direction flow of fluid caused during washing, that strips the trapped substances, so that an outer circumferential part thereof slidingly contacts an inner circumferential surface of the filter element to remove trapped substances.

6. The filtration device according to claim 5, wherein the filter element has a filter medium having a cylindrical shape open at both ends, wherein openings of mesh of the filter medium, which lets fluid pass through to filter the fluid, are elongated openings parallel with an axis of the filter element.

7. The filtration device according to claim 5, wherein the filter element has a filter medium having a cylindrical shape open at both ends, wherein a mesh pitch of the filter medium in an axial direction of the filter medium, which lets fluid pass through to filter the fluid, is larger than a mesh pitch of the filter medium in a circumferential direction of the filter medium.

* * * * *

UNITED STATES PATENT AND TRADEMARK OFFICE
CERTIFICATE OF CORRECTION

| | |
|---|---|
| PATENT NO. | : 10,052,574 B2 |
| APPLICATION NO. | : 15/028413 |
| DATED | : August 21, 2018 |
| INVENTOR(S) | : Yuichi Takahashi et al. |

Page 1 of 1

It is certified that error appears in the above-identified patent and that said Letters Patent is hereby corrected as shown below:

On the Title Page

Item (56) References Cited:
FOREIGN PATENT DOCUMENTS
Replace "JP 32-068380" with --JP 02-068380--.

Signed and Sealed this
Twenty-seventh Day of August, 2019

Andrei Iancu
*Director of the United States Patent and Trademark Office*